US011695643B1

(12) United States Patent
Cawley et al.

(10) Patent No.: US 11,695,643 B1
(45) Date of Patent: Jul. 4, 2023

(54) STATISTICAL CONTROL RULES FOR DETECTING ANOMALIES IN TIME SERIES DATA

(71) Applicant: Rapid7, Inc., Boston, MA (US)

(72) Inventors: Seamus Cawley, Dublin (IE); David Tracey, Monasterboice (IE)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 17/513,620

(22) Filed: Oct. 28, 2021

(51) Int. Cl.
*G06F 15/173* (2006.01)
*H04L 41/147* (2022.01)
*H04L 43/067* (2022.01)
*H04L 43/16* (2022.01)
*H04L 43/045* (2022.01)

(52) U.S. Cl.
CPC .......... *H04L 41/147* (2013.01); *H04L 43/045* (2013.01); *H04L 43/067* (2013.01); *H04L 43/16* (2013.01)

(58) Field of Classification Search
CPC ...... H04L 41/147; H04L 43/045; H04L 43/16
See application file for complete search history.

(56) References Cited

U.S. PATENT DOCUMENTS 9,606,520 B2 3/2017 Noboa et al.
10,831,180 B2 11/2020 Gold
2015/0304346 A1 10/2015 Kim
2016/0147583 A1* 5/2016 Ben Simhon ......... G06F 11/076 714/47.3
2018/0039898 A1* 2/2018 Saini ..................... G06F 21/554
2018/0219879 A1* 8/2018 Pierce ................. H04L 63/1416
2021/0034581 A1* 2/2021 Boven .................. G06K 9/6256

OTHER PUBLICATIONS

Engineering Statistics Handbook "Chapter 6 Process or Product Monitoring and Control", Retrieved from https://www.itl.nist.gov/div898/handbook/pm/pmc.htm, Oct. 21, 2021, pp. 1-50.
"Anomaly Monitor", Retrieved from https://docs.datadoghq.com/monitors/create/types/anomaly/ on Oct. 21, 2021, pp. 1-10.
(Continued)

*Primary Examiner* — Padma Mundur
(74) *Attorney, Agent, or Firm* — Ashwin Anand; Lei Sun

(57) ABSTRACT

Systems and methods are disclosed to implement a time series anomaly detection system that uses configurable statistical control rules (SCRs) and a forecasting system to detect anomalies in a time series data (e.g. fluctuating values of a network activity metric). In embodiments, the system forecasts future values of the time series data along with a confidence interval based on seasonality characteristics of the data. The time series data is monitored for anomalies by comparing actual observed values in the time series with the predicted values and confidence intervals, according to the SCRs. The SCRs may be defined and tuned via a configuration interface that allows users to visually see how different SCRs perform over real data. Advantageously, the disclosed system allows users to create custom anomaly detection triggers for different types of time series data, without use of a monolithic detection model which can be difficult to tune.

20 Claims, 10 Drawing Sheets

(56) References Cited

OTHER PUBLICATIONS

Wikipedia, "Nelson rules", Retrieved from https://en.wikipedia.org/wiki/Nelson_rules on Oct. 21, 2021, pp. 1-4.

Chris Swierczewski, et al., "Use the built-in Amazon SageMaker Random Cut Forest algorithm for anomaly detection", AWS Machine Learning Blog, Retrieved from https://aws.amazon.com/blogs/machine-learning/use-the-built-in-amazon-sagemaker-random-cut-forest-algorithm-for-anomaly-detection/ on Oct. 21, 2021, pp. 1-12.

* cited by examiner stored data 300

| Time 310 | # Login Attempts (Observed) 320 | # Login Attempts (Predicted) 330 | Confidence Interval 340 | Distance Metric 350 |
|---|---|---|---|---|
| 2021-10-01 | 106 | 106 | [101, 111] | 0 |
| 2021-10-02 | 2 | 3 | [0, 5] | 0.5 |
| 2021-10-03 | 3 | 4 | [1, 6] | 0.5 |
| 2021-10-04 | 130 | 114 | [107, 121] | 2.28 |
| 2021-10-05 | 115 | 112 | [107, 117] | 0.6 |
| 2021-10-06 | 110 | 114 | [106, 122] | 0.5 |
| 2021-10-07 | 112 | 112 | [104, 120] | 0 |
| 2021-10-08 | 105 | 106 | [101, 111] | 0.2 |
| 2021-10-09 | | 3 | [0, 6] | |
| 2021-10-10 | | 4 | [1, 6] | |

forecast horizon 360 time series data 140 forecast data 160

FIG. 3

Activity Metric Forecast Model 500

Model Information: *510*
- Model Name: Outbound Traffic Volume Forecast
- Created: 2021-05-05
- Last Updated: 2021-08-09

Model Hyperparameters: *520*
- Observation Period: Hourly
- Forecast Horizon: 1 Hour
- Seasonality: Weekly   Fourier Order: 10
-   Monthly   Fourier Order: 10
-   US Holidays
- Confidence Interval: 95%

Training Data: *530*
- Training Dataset: Outbound-Traffic-Q3-2021
- Time Range: 2021-09-01 to 2021-09-30

[ Load Model 540 ]
[ View Model History 542 ]
[ View Model Performance 544 ]
[ Begin Model Training 546 ]
[ Save Model 548 ]

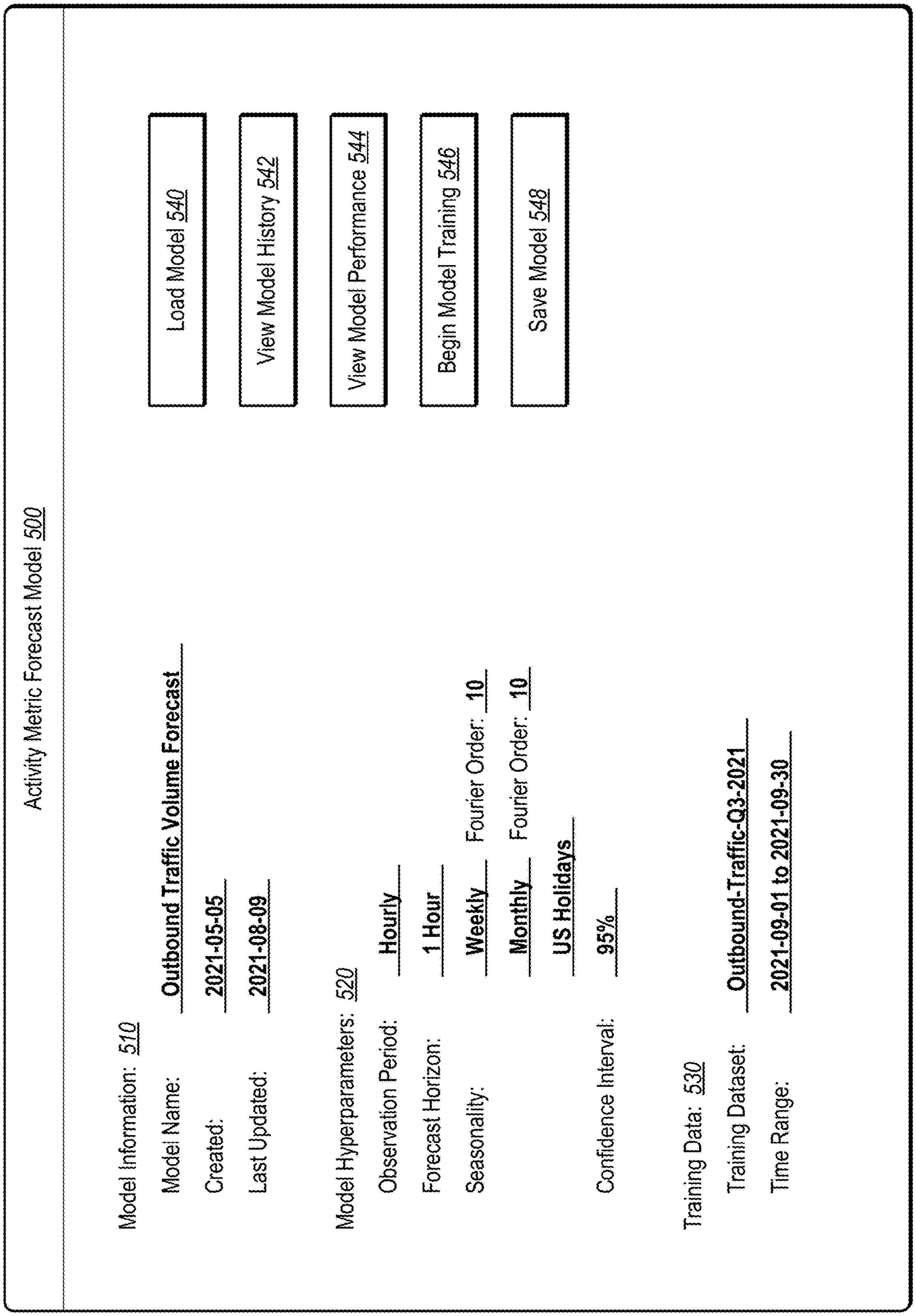

*FIG. 5*

STATISTICAL CONTROL RULES FOR DETECTING ANOMALIES IN TIME SERIES DATA

BACKGROUND

Time series are commonly used to track statistics or metrics generated by computer systems or users. Detecting unusual or anomalous events or trends in time series data is an active area of research. Different anomaly detection techniques have been proposed in different contexts, ranging from simple threshold checks to sophisticated machine learning based approaches. Threshold-based anomaly detection systems typically recognize an anomaly when the time series value falls outside a predefined threshold. Threshold checks are easy to implement and can be computationally efficient. They do, however, rely on the user's expert knowledge to set the threshold value appropriately. A threshold that is too low will generate too many false positives, and a threshold that is too high will cause anomalies to be missed. Moreover, simple thresholds are not sensitive to complex data characteristics such as recent trends or seasonality. At the other extreme are machine learned anomaly detection models, which can produce good results when properly trained. However, these models are difficult to build and tune, typically requiring long training periods and large amounts of training data to achieve the desired performance. Machine learning models also have the drawback of being "black boxes," providing little clue as to why a particular observation was flagged as an anomaly. Better anomaly detection solutions are needed for detecting anomalies in time series data to overcome these problems in the state of the art.

SUMMARY OF EMBODIMENTS

The systems and methods as described herein may be employed in various combinations and in embodiments to implement a time series anomaly detection system that uses configurable statistical control rules (SCRs) to detect anomalies in a time series data (e.g. fluctuating values of a network activity metric). In some embodiments, the system forecasts future values of the time series data based on the data's seasonality characteristics. The system then monitors actual values in the time series for anomalies by comparing the actually observed values with the predicted values and their confidence intervals, according to a set of configured SCRs. In some embodiments, the SCRs may be defined and configured using a configuration interface of the system that allows users to visually see how different combinations of SCRs perform over real data. Users can use these visualizations to experiment with different SCRs and create targeted anomaly detection triggers for different types of time series data. Advantageously, the network anomaly detection system is able to account for complex statistical conditions in the time series data, such as seasonality and recent trends, without using an end-to-end anomaly detection model that is difficult to interpret and tune.

BRIEF DESCRIPTION OF THE DRAWINGS

FIG. 3 illustrates example time series data and forecast data generated for a network activity metric, according to some embodiments.

FIG. 5 illustrates a graphical user interface (GUI) that allows users to configure a forecast model to generate forecast data for an activity metric, according to some embodiments.

Figure 1:
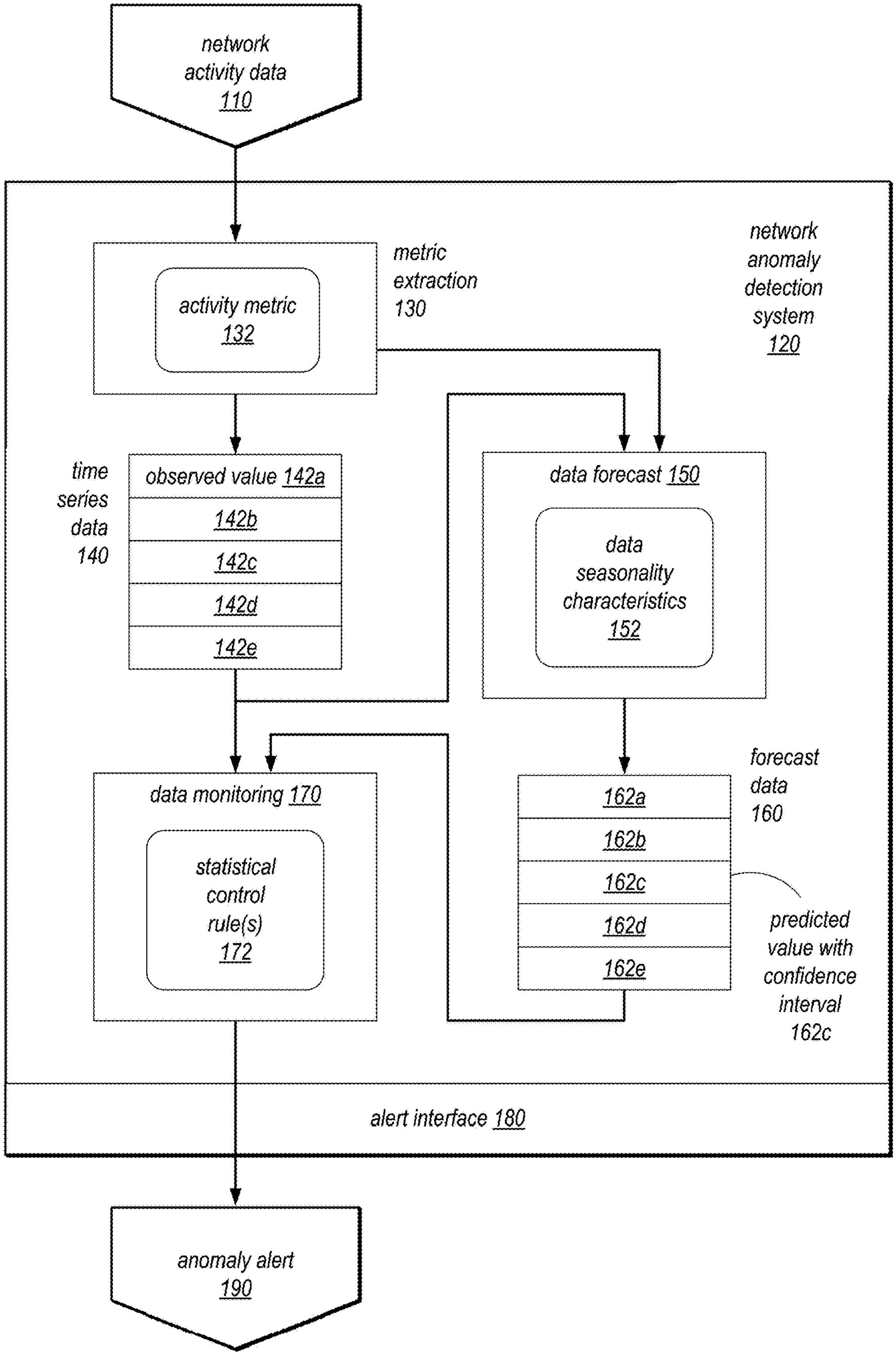
FIG. 1 is a block diagram illustrating a network anomaly detection system that uses statistical control rules (SCRs) to compare a time series data with forecast data in order to detect anomalies in the time series data, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Embodiments of a network anomaly detection system are disclosed herein that use configurable statistical control rules (SCRs) to detect anomalies in a time series data (e.g. fluctuating values of a network activity metric). In some embodiments, the system generates forecasts of the time series data along with confidence intervals, based on seasonality characteristics of the data. The system then monitors actual values in the time series for anomalies by comparing the observed values with the predicted values and confidence intervals, according to a set of defined SCRs. The SCRs act as quality control rules to monitor the time series data for deviations or aberrant behavior with respect to the forecast data. The disclosed system is more accurate than simple threshold checking systems by taking into account complex characteristics of the data such as seasonality. At the same time, the system is easier to build and maintain than machine learned anomaly detection models, which must be trained and retrained over time using large amounts of training data.

Depending on the embodiment, the forecasting step may be implemented as a static forecasting function or a machine learning model. The forecasting model in this context does not actually perform anomaly detection on the time series data. Rather, it only generates the forecast data, which is used as a baseline to analyze the time series data for anomalies. The forecasting model may be configured or trained to have knowledge about seasonality (e.g. weekly fluctuations) in the data. The forecasting model may be used to generate successive prediction values at regular time intervals, along with the accompanying confidence intervals. The forecasting model may be created or updated by the user via a configuration interface, using one or more ranges of the time series data as training data.

In some embodiments, the system will apply the SCRs at regular time intervals to each observed value in the time series data to compare the observed values to the predicted values in the forecast data. The SCRs may be used to implement different control limits on the time series data, which are triggered when values in the time series data behave unexpectedly with respect to the forecast data. The SCRs may act as process control rules (e.g. Nelson rules) for controlling industrial processes. However, instead of applying the mean and standard deviation to the confidence interval of a monitored process value as with the Nelson rules, the SCRs are applied to a confidence interval based on the predicted values of the time series and their confidence intervals. For example, an SCR may specify that an anomaly is detected when an observed datapoint is outside the confidence interval of its prediction. The disclosed approach thus combines the robustness, flexibility, and low cost of a rule-based detection system with the sophistication of complex machine learning systems (e.g. by generating forecast data that reflects seasonality of the data).

In some embodiments, the system provides a configuration interface that allows a user to configure the custom SCRs for a particular time series data. The configuration interface may allow the user to select rules from a library of previous SCRs created by other users (e.g., based on Nelson rules). The configuration interface may enable multiple SCRs to be combined using logical operators (e.g. Boolean operators or if-else operators) to create a compound anomaly detection rule. The configuration interface may provide performance feedback about selected SCRs based on real data, so that the user can experiment with different combinations of SCRs without having an in-depth understanding of the data in advance. The configuration interface allows any novice user to easily and quickly implement anomaly detection indicators for a wide variety of high-volume data scenarios.

As will be appreciated by those skilled in the art, embodiments of the network anomaly detection system as described herein provide many technical advantages over existing anomaly detection systems in the state of the art, to improve upon the functioning of these existing systems. These and other features and benefits of the network anomaly detection system are described in detail below, in connection with the figures.

FIG. 1 is a block diagram illustrating a network anomaly detection system that uses statistical control rules to compare a time series data with forecast data in order to detect anomalies in the time series data, according to some embodiments.

As shown, the depicted network anomaly detection system 120 is configured to receive network activity data 110. The network activity data 110 may be collected from a remote network being monitored by the system 120, for example, for signs of cyberattacks or other type of threat detection. In some embodiments, the network activity data 110 may include timestamped events organized as a time-sequenced log. The network activity data 110 may include observed events such as user logons, machine reboots, machine errors, configuration changes, API response times, resource utilization metrics, as well as many other types of observations. In some embodiments, the event logs may be uploaded to the network anomaly detection system 120 via a network-accessible upload interface, and stored in a log repository maintained by the system.

In some embodiments, the network anomaly detection system 120 may implement a metric extraction component 130 that extracts one or more activity metrics 132 from the network activity data 110. The network activity metric 132 may be calculated from network activity data 110 in regular time periods, for example, once an hour, once a day, once a week, etc. Examples of network activity metric 132 may include values such as the number of log lines seen per observation period, the number of network events observed per period, the amount of errors observed per period, the number of logins (or failed login attempts) observed per period, the average service response time observed per period, the number of service requests received per period, or the amount of a type of network traffic observed per period (e.g. ingress traffic, egress traffic, traffic using a specific communication protocol, etc.), and many others. In some embodiments, the system 120 may be configured to monitor a set of multiple activity metrics 132 for a given network to monitor the network for signs of anomaly.

As shown, the metric extractor 130 may continuously generate successive values of the activity metric 132 to produce a time series 140 of observed values 142*a-e* of the activity metric. In some embodiments, the time series data 140 may be stored as a separate log in the system's log repository, so that it can be searched or queried just as any other event log in the system.

In some embodiments, the time series data 140 is provided as input to a data forecast component 150, which will generate forecast values for the time series data (e.g. predicted values of the activity metric 132 and prediction confidence intervals). The predictions may be made based purely on the time series data 140, or in some embodiments, based on additional time-dependent variables in the network activity data, which may be extracted by the metric extractor 130 as additional time-varying metrics.

Depending on the embodiment, the data forecaster 150 may be implemented as a static function or a machine learning model. The data forecaster 150 may be encoded with knowledge of the seasonality characteristics 152 of the time series data 140, so that its output is dependent on the seasonality characteristics. For example, the forecaster 150 may be a sinusoidal function that is fitted to the historical behavior of the activity metric. As another example, the forecaster 150 may be a machine learning model that was trained to generate output in accordance with the seasonal cycles of the data, such as daily cycles, weekly cycles, yearly holidays, etc. In some embodiments, the forecaster 150 may periodically self-adjust over time to better align its predictions with the observed values of the time series data.

In some embodiments, the data forecaster 150 will continuously generate forecast data 160 for the activity metric, which comprises a time series of forecast data values 162*a-e*. For example, in some embodiments, the forecaster 150 may predict one time period ahead of the time series data 140 to generate the next value of the time series data in the future. Each output value of the forecaster (e.g. value 162*c*) will include a predicted value of the activity metric at a future time interval, and a confidence interval or error bound of the predicted value. In some embodiments, the confidence interval may be generated so that the likelihood that the observed value will fall within the interval is above a certain probability threshold. For example, the confidence interval may be chosen so that the observed value fall within the interval with 90% probability. In some embodiments, the confidence intervals may be generated by the data forecaster 150 itself. In other embodiments, the confidence intervals may be generated by a separate function or machine learning model, based on observed divergence of the predicted values. In some embodiments, the forecast data 160 may be stored in the log repository along with the time series data.

In some embodiments, the forecast data 160 and the time series data 140 are analyzed by the data monitoring component 170 to detect anomalies in the time series data. The data monitoring component 170 will compare individual values in the time series data 140 with corresponding values in the forecast data to determine if the observed values represent anomalies. In some embodiments, the metric extractor 130, the data forecaster 150, and the data monitor 170 may operate in a synchronized fashion, so that in each time period, a current value 142 for of the time series data is generated by the metric extractor, a next value 162 of the time series data is generated by the data forecaster, and the current value is compared with a previous value predicted by the data forecaster in a previous time period. In this manner, the network anomaly detection system 120 will continuously monitor the time series data 140 for anomalies by examining each observed value 142 in the time series.

The comparison analysis performed by the data monitor 170 is governed by a set of statistical control rule(s) 172, which may be specifically defined or configured for the time series data 140. The statistical control rules (SCRs) 172 are akin to "process control rules" used to monitor the output of an industrial process. However, in this context, the monitored output is the time series of the activity metric values produced by the network. The SCRs implement a set of rules that compares values 142 in the time series data with the predicted values and confidence intervals 162 in the forecast data. When fluctuations in the time series data behave unexpectedly based on the SCRs with respect to the forecast data, a potential anomaly is detected.

In some embodiments, some of the SCRs 172 may be defined based on a distance measure between the observed values 142 and the predicted values. In some embodiments, the distance metric may be normalized by the confidence interval of the predicted value, so that the actual distance grows or shrinks with the confidence interval. For example, in some embodiments, the distance metric may be calculated using the following formula:

$$d = \left| \frac{a - p}{\min(|c_u - a|, |c_l - a|) - p} \right|$$

where d is the distance measure, a is an actually observed value in the time series, p is the predicted value, $c_u$ is the upper bound of the confidence interval, and $c_l$ is the lower bound of the confidence interval.

The SCRs are configurable to implement a variety of robust anomaly indicators or triggers. For example, the following is a list of SCRs that parallel the Nelson rules, which can be adapted for use as anomaly detect triggers for the time series data:

Rule 1: The latest datapoint has a d value of greater than 3

Rule 2: Nine consecutive datapoints have a d value of greater than 1

Rule 3: Six consecutive datapoints have a d value of greater than 1 occurring on the same side of their predicted values, and are continually increasing or decreasing Rule 4: Fourteen or more datapoints have a d value of greater than 1 and alternating in direction Rule 5: Two or more of the last three datapoints have a d value of greater than 2 and are the same side of the predicted values Rule 6: Four or more of the last five datapoints have a d value of greater than 1 and are the same side of the predicted values Rule 7: Fifteen consecutive datapoints with a d value of greater than 1 but less than 2

Rule 8: Fifteen consecutive datapoints with a d value of greater than 2

In some embodiments, when one or more of the SCRs 172 are satisfied, the data monitor 170 issues an anomaly alert 190 via an alert interface 180 of the system. The anomaly alert 190 may indicate information about the detected anomaly, for example, the activity metric 132 in question, the time period when the anomaly occurred, and/or the SCRs that were triggered for the detection. In some embodiments, the alert 190 may indicate additional information (e.g. portions of the underlying event log that corresponds to the detected anomaly).

Depending on the embodiment, the alert interface 180 may be implemented in different ways. In some embodiments, the alert interface may be a human interface such as a graphical user interface, an email interface, or a text or message interface. In some embodiments, the alert interface may be a programmatic interface (e.g. an API) that can invoke other software components outside the system 120. Such software components may be invoked to perform a more detailed examination of the detected anomaly, or initiate an automated response based on the detected anomaly. In some embodiments, a detected anomaly may be automatically stored along with the network activity data 110 or time series data 140 in the log repository of the system, so it can be easily seen and analyzed by data analysts working with the system.

As will be appreciated by those skilled in the art, the network anomaly detection system 120 can be adapted to detect anomalies in many different types of network activity metrics. Advantageously, the system allows users to configure the SCRs over time to define a custom set of anomaly conditions for different types of network activity metrics. Unlike simple threshold-based detection systems, the SCRs allow the system to monitor for temporal behavior in the time series data, such as recent data trends or unexpected fluctuations. Seasonality characteristics of the data are encoded in the forecast data, so that they are taken into account by the monitoring process. Finally, the system avoids the use of an end-to-end machine learning model for anomaly detection. As discussed, such models can be resource intensive and time consuming to build and tune, and difficult to interpret.

Figure 2:
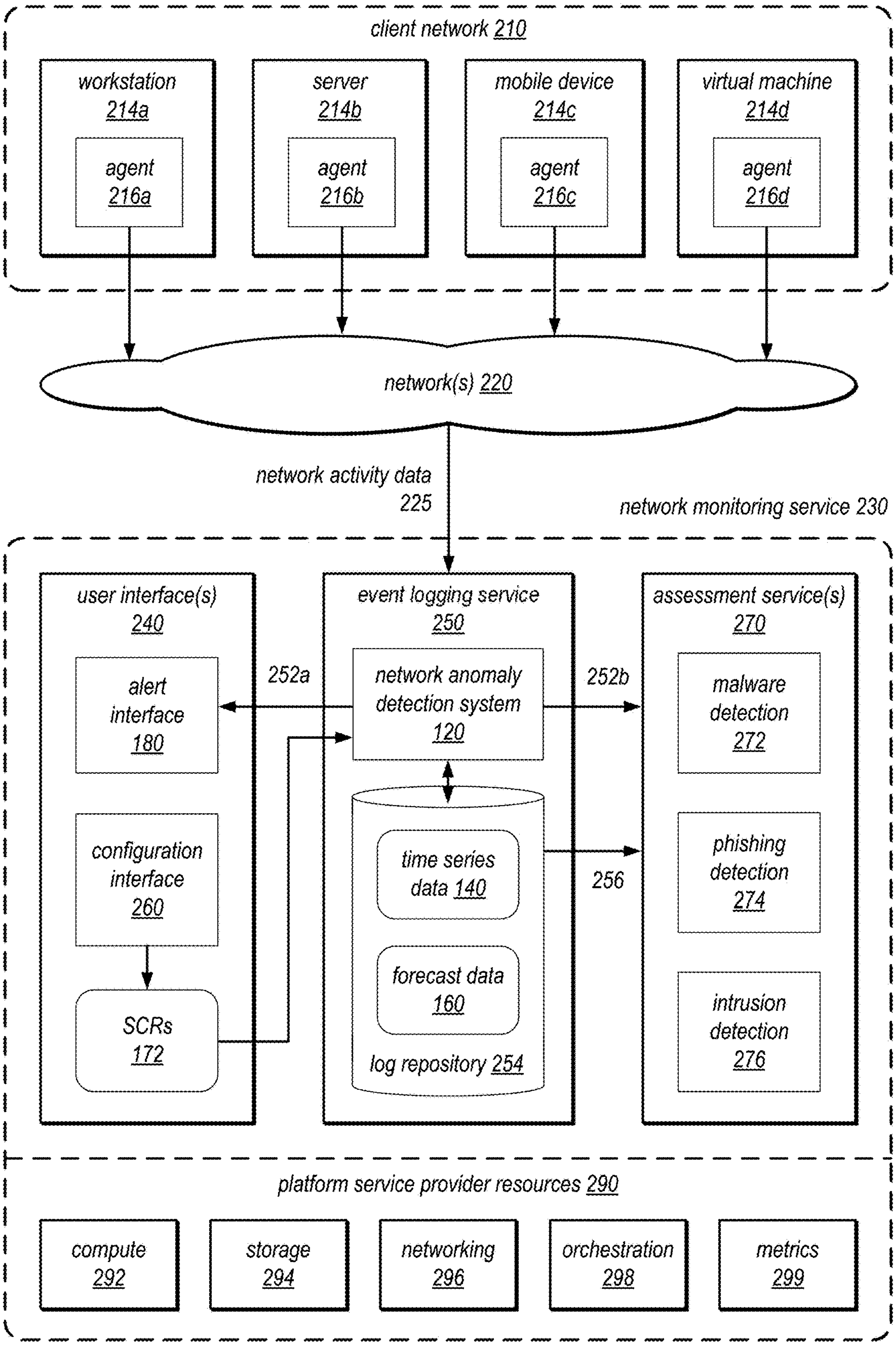
FIG. 2 is a block diagram illustrating a network monitoring service implemented in a platform service provider network that implements a network anomaly detection system, according to some embodiments.

FIG. 2 is a block diagram illustrating a network monitoring service implemented in a platform service provider network that implements a network anomaly detection system, according to some embodiments.

As shown in FIG. 2, an instance of the network anomaly detection system 120 is implemented in a network monitoring service 230. In some embodiments, the network monitoring service 230 may be a service implemented in the cloud and on a platform service provider network, such as a platform-as-a-service (PaaS) network, an infrastructure-as-a-service provider (IaaS) network, or a software-as-a-service (SaaS) network. The network monitoring service 230 may be configured to communicate with many agents 216*a-d* deployed on machines 214*a-d* in a client network 210. The agents 214 may communicate with the network monitoring service 230 over one or more intermediary networks 220. In some embodiments, the agents may be configured to collect or generate network activity data 225, such as network activity 110 of FIG. 1, and transmit the data to the network monitoring service 230. The network monitoring service 230 may receive network activity data from many different clients (e.g. different entities, companies, organizations, groups, geographic locations, networks, etc.), and perform remote monitoring of the networks of these different clients.

As shown, the client network 210 in this example includes different types of computing resources, such as a workstation 214*a*, a server 214*b*, a mobile device 214*c*, and a virtual machine 214*d*. The virtual machine 214*d* may be an instance of a computer and operating system that is emulated and hosted on a physical virtual machine host. The virtual machine host may implement virtualization hardware and/or software (e.g. a hypervisor) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment may be a hosted container, which provides a portable and isolated execution environment over a host operating system of a physical host. Examples of container hosting technologies include DOCKER, GOOGLE KUBERNETES, AMAZON WEB SERVICES, and MICROSOFT AZURE. In some embodiments, the virtual machine 214*d* may be hosted in a platform service provider network, such as the platform service provider network that is hosting the network monitoring service 230. Depending on the embodiment, the agents 216 may be deployed on other types of computing systems, including embedded systems, networking devices, storage devices, Internet-of-Things (IoT) devices, vehicles, and the like.

In various embodiments, the network 220 may encompass any suitable combination of networking hardware and protocols necessary to enable communications between the agents 216 and the network monitoring service 230. In some embodiments, the remote machines 214 may execute in a private network of a company, behind a company firewall, and the network 220 may include a public network such as the Internet, which lies outside the firewall. The network 220 may encompass the different telecommunications networks and service providers that collectively implement the Internet. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stacks, routing software, firewall/security software, etc.) for establishing networking links between the remote machines 214 and the network monitoring service 230. In some embodiments, the agents 216 may transmit the network activity data 225 to the network monitoring service 230 over secure communication channels such as transport layer security (TLS) connections implemented over the network 220.

As shown in this example, the network monitoring service 230 is implemented using a number of constituent services 240, 250, and 270 implemented by the platform service provider network. Clients of the network monitoring service 230 may convey service requests to and receive responses from these services. In some embodiments, the service request and responses may be defined as part of a RESTful API (e.g. one or more web services). The requests and responses may be formatted as JSON documents. In some embodiments, the network monitoring service 230 may implement service interfaces using other types of remote procedure calling protocols, such as GOOGLE PROTOCOL BUFFERS. The platform service provider network may provide the hardware and/or software needed to implement service endpoints for these services, and the request routing facilities to ensure that a request is properly routed to the appropriate endpoints.

As shown, the platform service provider network may provide different types of computing resources 290, which can be leased by customers to implement hosted services. As shown, the platform service provider may provide resource services such as compute resource service 292, storage resource service 294, networking resources service 296, orchestration service 298, and resource metrics service 299. The services of the network monitoring service 230 may be built using these underlying resource services provided by the platform service provider. In some embodiments, the platform service provider resources 290 may implement features such as load balancing of service requests and/or dynamic management and scaling of service node pools. In some embodiments, each of the services 240, 250, and 270 may be implemented using a pool of service nodes provided by the platform service provider, which may be individual instances of virtual machines. In some embodiments, the platform service provider may be a provider such as AMAZON WEB SERVICES or MICROSOFT AZURE.

In some embodiments, the network monitoring service 230 may be configured to monitor, analyze, and take action on security-related incidents that are detected in the remote client networks 210. In some embodiments, the network monitoring service 230 may implement an event logging service 250 that receives network activity data 225 from the remote client network and stores the received data as event logs into a log repository 254. The event logging service 250 may implement service functionality to allow users or other software components to query the event logs stored in the log repository 254. As shown in this example, the time series data 140 and forecast data 160 are stored as logs in the log repository 254. In some embodiments, log data in the log repository 254 may be stored as separate files in a file system. In some embodiments, data in the log repository 254 may be distributed across multiple geographic locations.

As shown, in some embodiments, output 252 of the network anomaly detection system 120 may be used by various network assessment service(s) 270 to perform automated machine assessment processes. For example, the assessment service(s) 270 may be triggered by anomaly alerts 190 generated by the network anomaly detection system 120. These alerts may cause the assessment service(s) 270 to perform a more in-depth examination 256 of the relevant portions of the event logs stored in the log repository 254. For example, in some embodiments, a malware detection module 272 may examine the machine event logs to detect the installation of a particular type of malware executable. As another example, a phishing detection module 274 may examine the email event logs to detect phishing attacks using new or unusual email addresses, web addresses, or email content. As yet another example, an intrusion detection module 276 may examine the network event logs to detect suspicious communication patterns or attacker packet signatures. In some embodiments, the assessment service(s) 270 to generate further alerts or notifications, or perform automated mitigation actions to address detected threats in the client network 210.

As shown, the network monitoring service 230 may implement one or more user interface(s) 240, which may be implemented as GUIs or web interfaces viewable using a web browser. In some embodiments, these user interfaces 240 may be implemented by client-side applications. As shown, the user interfaces may include the alert interface 180 to notify users of anomalies 252*a* detected by the network anomaly detection system 120. In some embodiments, the alert interface 180 may be accessible from both the client network 210 and a central monitoring location where security analysts are monitoring the client network.

In some embodiments, the user interface(s) 250 may also implement a configuration interface 260. The configuration interface 250 may be used to configure various aspects of the network anomaly detection system 120, such as the operating parameters of the metric extractor 130, data forecaster 150, or data monitor 170. As shown, the configuration interface 260 may be used to define and modify the SCRs 172 used by the network anomaly detection system. In some embodiments, the configuration interface 260 may provide a visualization of how the SCRs perform over real ranges of the time series data 140, so that users can experiment with different combinations of SCRs to capture the vast majority of relevant anomalies in the data while avoiding large numbers of false positives.

FIG. 3 illustrates example time series data and forecast data generated for a network activity metric, according to some embodiments.

The network activity metric in this example is the number of login attempts at a client network in successive time intervals. As shown, the data 300 is stored as a table of five fields, where fields 310 and 320 are part of the time series data 140, and fields 330 and 340 are part of the forecast data 160. As discussed, in some embodiments, the time series data 140 and the forecast data 160 may be stored as separate log files in a log repository (e.g. log repository 254).

As shown in this example, the activity metric is observed daily to record a series of observed values 320. The forecast data is generated ahead of the observations, by a component such as the data forecaster 150. In this example, the forecast data is generated two days ahead of the observed value, as indicated by the forecast horizon 360. In some embodiments, the forecast horizon 360 may be a configurable parameter of the data forecaster 120. In some embodiments, the system may generate multiple forecast data series with different forecast horizons, and values from the multiple forecast data series may be used in the SCRs.

As shown in this example, the forecast data 160 includes a confidence interval 340 for each predicted value 330. As discussed, this confidence interval may be calculated so that it captures the observed value with an expected probability (e.g. a 90% confidence interval). In some embodiments, this probability may be a configurable parameter of the data forecaster 150. In some embodiments, the confidence interval may be generated by the data forecaster itself. In other embodiments, the confidence interval may be generated by a separate component that adjusts the intervals based on the actual values 320 of the time series and the predicted values 330.

As shown, the stored data 300 in this example also includes a distance metric 350, which may be calculated by the data monitor 170. In this example, the distance 350 is calculated using the formula discussed previously. In some embodiments, this distance metric is stored along with the time series data 140 and the forecast data 160, so the time series data can be monitored based on recent values of the distance metric. In some embodiments, the stored data 300 may include additional data fields, such as other time-varying input data used by the SCRs, or other types of intermediate data values calculated by the data monitor 170 (e.g. a moving average of recent values).

FIGS. 4A to 4D illustrate different types of statistical control rules (e.g. SCRs 172) that could be used by the network anomaly detection system to detect anomalies in a time series data, according to some embodiments.

Figure 4A:
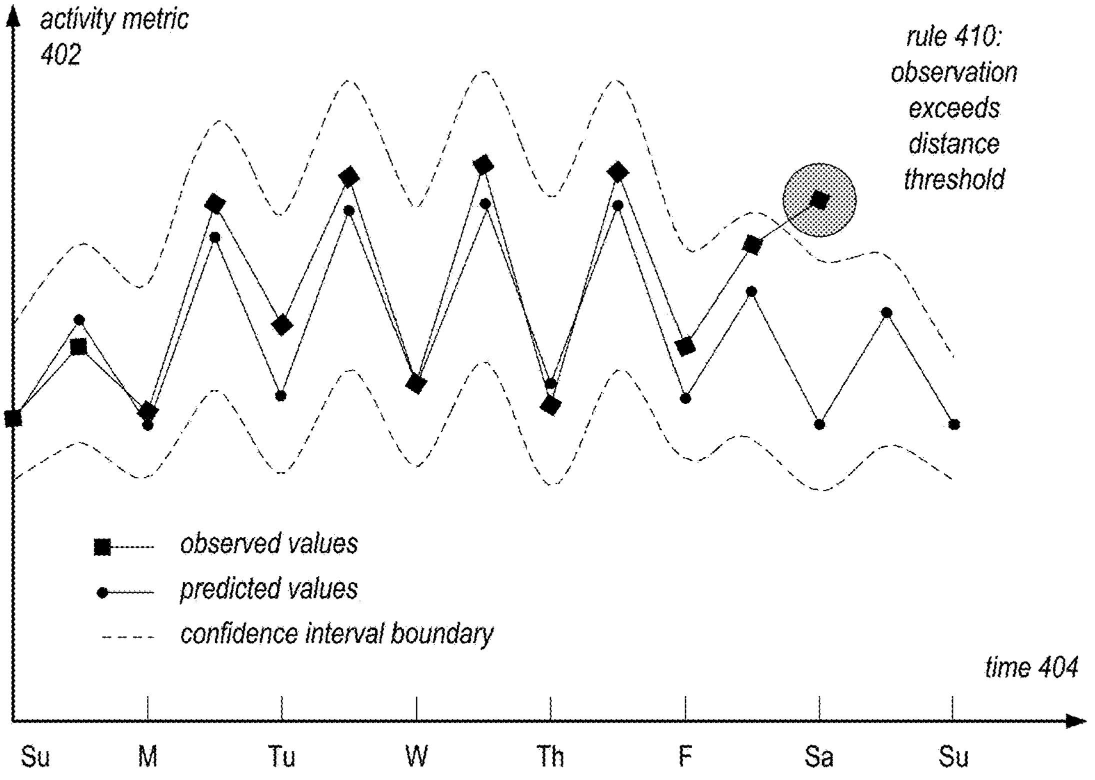
FIGS. 4A to 4D illustrate different types of statistical control rules that could be used by the network anomaly detection system to detect anomalies in a time series data, according to some embodiments.

FIG. 4A illustrates a SCR 410, which is triggered when the distance measure (e.g. distance 350) between an observed value of an activity metric 402 and the predicted value exceeds a specified distance threshold. The figure depicts a time graph of the activity metric 402 over time 404. As shown, the predicted values of the activity metric fluctuate based on a weekly pattern. Each of predicted values are associated with confidence intervals. In some embodiments, the distance threshold may be computed based on the confidence intervals, (e.g. a multiple of the size of the confidence interval). If the distance metric is calculated using the formula described previously (where the size of the confidence interval is normalized to a distance of 1), the distance threshold will simply be the selected multiple. As shown in this example, the last observed value of the activity metric deviates significantly from the predicted value, exceeding the configured distance threshold specified for SCR 410. As a result, an anomaly alert will be generated under SCR 410.

Figure 4B:
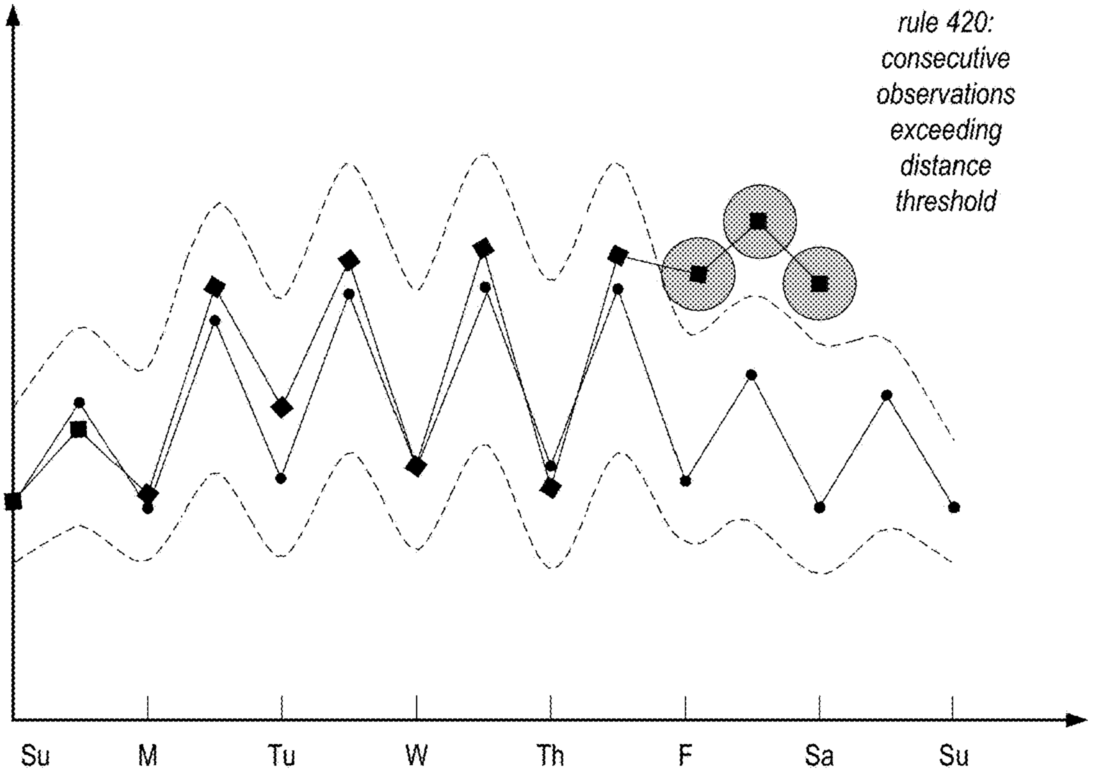

FIG. 4B illustrates SCR 420, which is triggered when multiple consecutive observations exceed the distance threshold from their predicted values. Such a rule may be useful to detect anomalies that are manifested over multiple observation periods (e.g. an usually high number of service requests sustained over several hours). Rule 420 is configured to define the minimum number of offending periods needed to trigger detection (here 3). In some embodiments, the rule may be defined to trigger when a specified proportion of the last number of observation cycles (e.g. 2 out of the last 3, 3 out of the last 5) meets an anomaly condition.

Figure 4C:
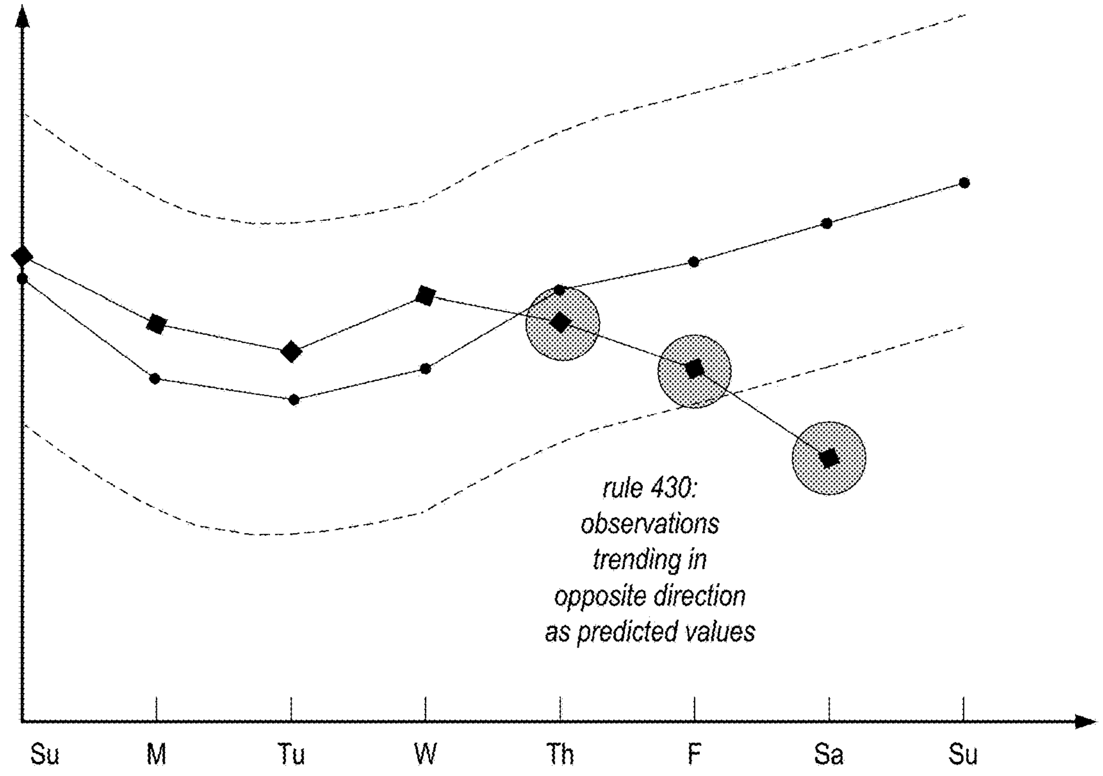

FIG. 4C illustrates SCR 430, which is triggered when a sequence of observations trends in the opposite direction from their predicted values. As shown in this example, when three consecutive observation values create a trend in the opposite direction as their predicted values, an anomaly condition is detected. This type of anomaly condition may be identified by data monitor 170 by tracking respective trends of the time series data and the forecast data, which may be stored as trend indicators in the log repository 254.

Figure 4D:
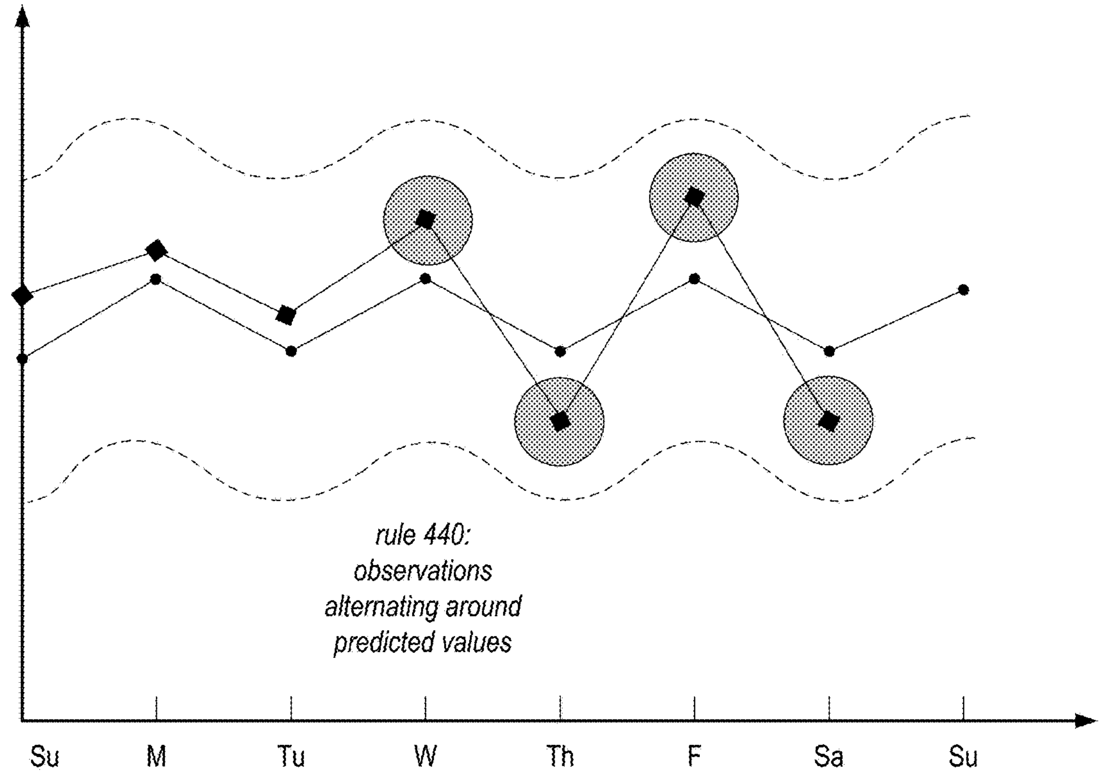

FIG. 4D illustrates SCR 440, which is triggered when a sequence of observations alternates above and below their predicted values. This type of condition may be seen as an anomaly in certain contexts because it indicates a degree of oscillation that is beyond mere noise, which may be indicative of additional actors in the network. This type of anomaly condition may be identified by data monitor 170 by tracking the oscillation behavior of the time series data with respect to the forecast data.

FIG. 5 illustrates a graphical user interface that allows users to configure a forecast model to generate forecast data for an activity metric, according to some embodiments.

Depicted GUI 500 may be implemented as part of the configuration interface 260 of FIG. 2.

GUI 500 allows users to configure a forecast model that generates forecast data for an activity metric. As discussed, in some embodiments, the data forecaster 150 may be implemented using a machine learning model that is trained to understand the seasonal characteristics of the time series data. Such a machine learning model may be created and periodically updated by the user via GUI 500.

As shown, section 510 of the GUI provides general information about the forecast model, including the model's name, creation date, and last update date. In some embodiments, forecast models created by users may be stored in a library maintained by the system, so that they can be shared with and reused by other users. In this example, a previously created forecast model in the library may be loaded using the load model button 540. The GUI also provides buttons 542 and 544 to allow users to view the model's update history and prediction performance, respectively.

Section 520 displays a number of configurable hyperparameters of the forecast model. As shown, the forecast model is currently configured to generate forecast data on an hourly basis, with a forecast horizon of one hour. The model is trained to account for seasonality based on weekly and monthly cycles, and days that are US holidays. In some types of forecast models (e.g. models created by the PROPHET modeling tool), seasonality is estimated using a partial Fourier sum. The number of terms in the partial sum (the order) determines how quickly seasonality can change in the forecast data, and thus how closely the forecast data will be fitted to the data. In this example, the Fourier order is configurable for different types of specified seasonality. Finally, as shown, the size of the confidence interval is also configurable. In some embodiments, the forecast model may be configured to generate multiple confidence intervals corresponding to different probability levels, and each of the multiple confidence intervals can be used in the SCRs.

Section 530 allows users to choose a training dataset for training the forecast model. In this example, the user has selected a particular log file and a particular time range within the log file as the training data. In some embodiments, the GUI may allow users to select training data from multiple files or data sources. Once the hyperparameters and training data have been specified, the user may click on button 546 to begin training the model, which may take a few minutes or hours, depending on the training method and the amount of training data. In this manner, the forecast model may be periodically retrained with additional training data to better adapt the model to subtle changes in the time series data. Once the training is completed and the resulting model's performance is deemed satisfactory, the user may use the save button 548 to save the model back to the library.

In some embodiments, retraining of the forecasting model may be automated, for example, by automatically identifying ranges of the time series data where the model's performance was unsatisfactory. Such retraining may be performed regularly (e.g. once a quarter), or immediately when a range of training data is identified. In some embodiments, the forecasting model may be continuously updated as new data is received.

Note that model training is only one way to build the forecast model. In some embodiments, the forecast model may be built and configured using other techniques, for example, by specifying a set of parameters for a time series prediction function. In such embodiments, GUI 500 may provide other appropriate control elements to configure the parameters of the forecast model.

Figure 6:
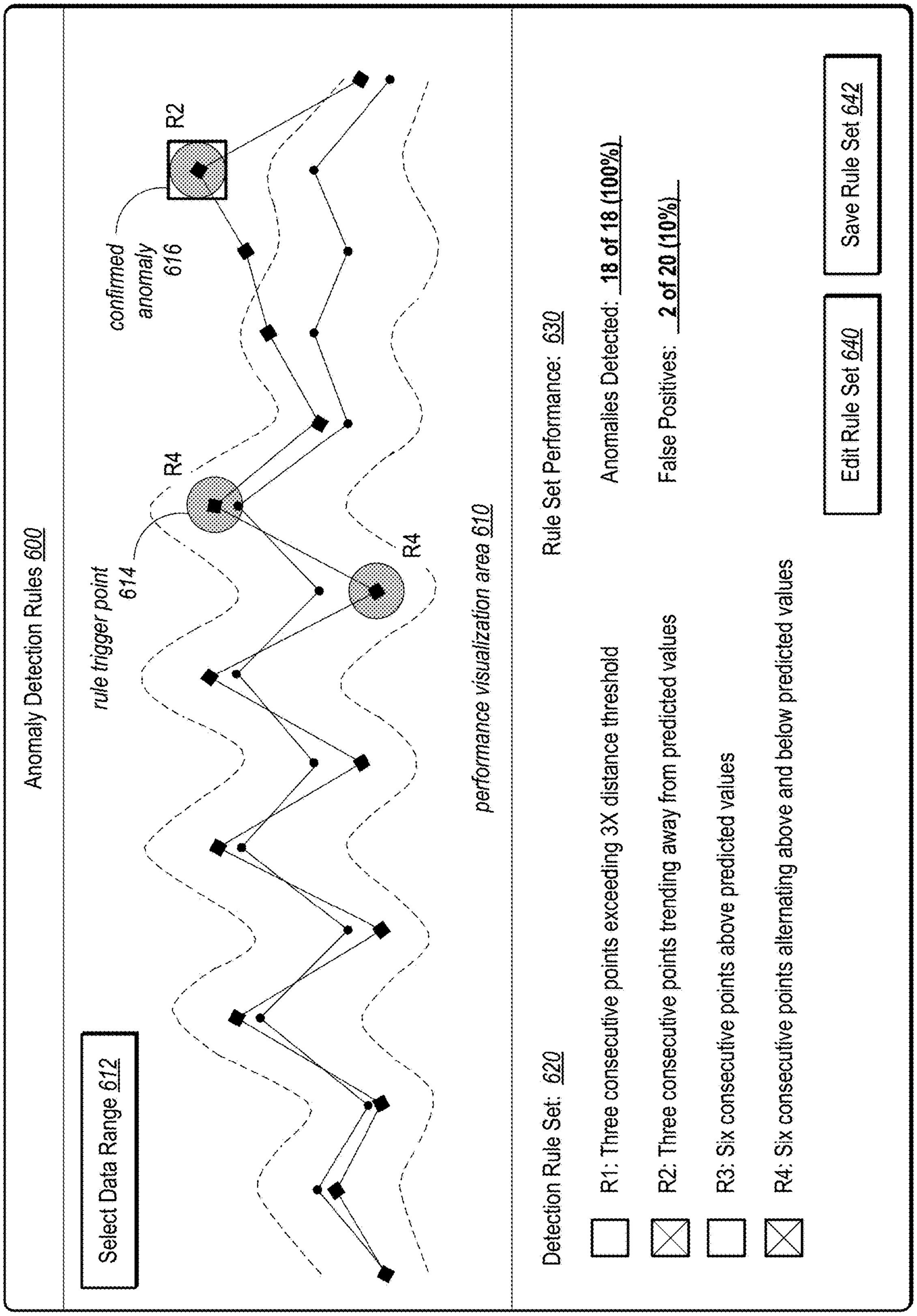
FIG. 6 illustrates a graphical user interface that allows users to configure statistical control rules to detect anomalies in an activity metric, according to some embodiments.

FIG. 6 illustrates a graphical user interface that allows users to configure statistical control rules to detect anomalies in an activity metric, according to some embodiments. Depicted GUI 600 may be implemented as part of the configuration interface 260 of FIG. 2. In some embodiments, portions of GUI 600 may be implemented as part of an alert interface such as alert interface 180.

As shown, GUI 600 includes a performance visualization area 610 that provides users a visualization of how a set of SCRs (here detection rule set 620) performs over an actual range of the time series data. The range may be selected via button 612. As shown, area 610 displays a time graph of the time series data, including individual observed values, predicted values, and confidence intervals in the selected range. The set of SCRs are evaluated over the range to determine datapoints where different rules are triggered (e.g. rule trigger point 614). Observations that triggered a particular rule are highlighted and labeled with the triggered rule.

As shown, some observation datapoints in the time graph are labelled as confirmed anomalies (e.g., confirmed anomaly 616). In some embodiments, these confirmations may be made by human analysts who investigated the underlying nature of the network activities associated with that observation. For example, a security analyst may have been alerted to a potential anomaly in the activity metric by the network anomaly detection system, and determined that the alert indeed corresponded to a genuine anomaly in the network (e.g. a cyberattack on the network). This confirmation may be recorded along with the time series data (e.g. in the log repository 254), and used to display the confirmed anomaly label 616 in the GUI. These labels give users a sense of how often the rules are able to identify genuine anomalies in the network, and how often they are reporting false positives.

The bottom of the GUI 600 is an area that allows the user to configure or tune the SCRs. Section 620 shows the current SCR rule set, which can be turned on and off to alter what rules are applied in the visualization area 610. These controls may also be used to configure which rules are enabled to generate alerts to other systems, as described for operation **252*b* of FIG. 2. Button 640** allows the user to make edits to the rule set, for example, to add, delete, or change the individual rules. In some embodiments, the SCRs may be defined by a rule specification language that allows the user to specify different types of detection parameters and conditions. In some embodiments, the SCRs may be specified in a general programming language such as C, JAVA, PYTHON, etc. In some embodiments, each SCR in the rule set may define a separate detection trigger, so that an alert is generated whenever any rule in the rule set is satisfied. In other embodiments, the rules in the rule set may be combined using Boolean or control flow logic to create more complex detection triggers. In some embodiments, the rules in the rule set may be combined according to a mathematical formula to generate an anomaly score. An anomaly alert may be generated when the anomaly score exceeds a severity threshold.

As shown, the bottom of the GUI 600 also includes a rule set performance section 630. This section may be used to display different types of performance metrics for the rule set, such as the percentage of confirmed anomalies detected, and the percentage of detections that are false positives (e.g. detections that are not confirmed anomalies). In some embodiments, these performance metrics may be calculated based on the selected data range in the visualization area 610. In some embodiments, the performance metrics may be calculated for individual SCRs or a selected subset of the SCRs in the rule set. The performance metrics offer users important information when configuring the rule set, so that the rules can be optimized to capture all of the real anomalies and exclude most of the false positives.

As shown, the GUI 600 also allows the user to save the rule set via button 642. In some embodiments, the SCRs may be saved for a particular time series data in a library, so that the SCRs may be viewed and reused by other users. The library may be the same library used to store the forecast model(s) for the time series data, as discussed in connection with FIG. 5.

Figure 7:
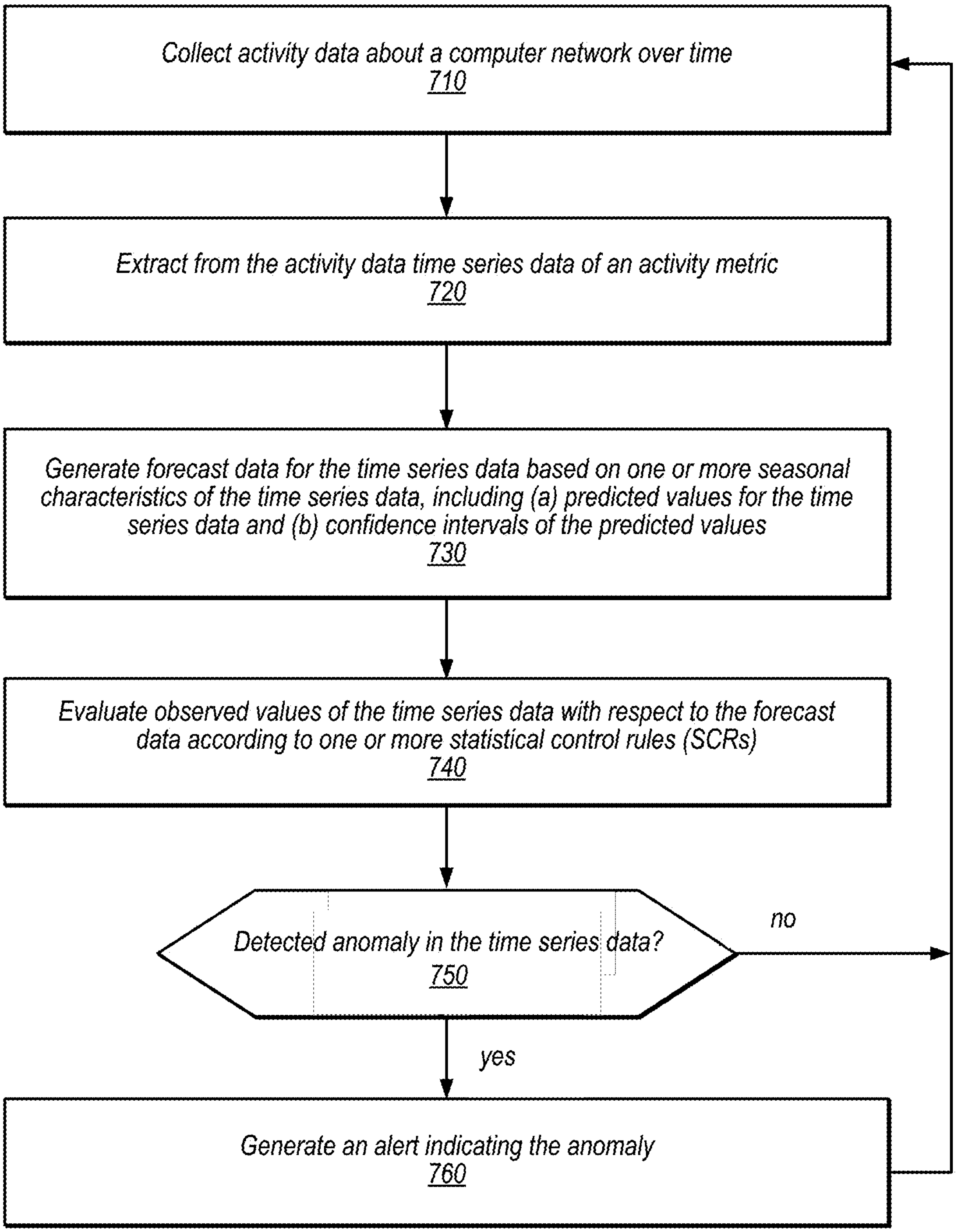
FIG. 7 is a flowchart illustrating an anomaly detection process performed by a network anomaly detection system, according to some embodiments.

FIG. 7 is a flowchart illustrating an anomaly detection process performed by a network anomaly detection system (e.g. network anomaly detection system 120), according to some embodiments.

At operation 710, activity data about a computer network (e.g. network activity data 110) is collected over time. The activity data may be collected by agents deployed in the network, as discussed in connection with FIG. 2, and transmitted over a public network to the network anomaly detection system. In some embodiments, the activity data may include timestamped events observed in the computer network, organized as event logs. The network anomaly detection system may be implemented as part of a network monitoring system that collects network activity data from a large number of client networks and monitors such data for security issues (e.g. cyberattacks or security vulnerabilities).

At operation 720, a time series data (e.g. time series 140) of an activity metric is extracted from the collected activity data. Operation 720 may be performed by a component such as the metric extractor 130 of FIG. 1. The activity metric may be a variety of time-varying values that indicate an activity level in the network within a time period, and may include values such as the number of log lines generated, an amount of errors observed (e.g. a particular type of HTTP or application error), the number of logins (or failed login attempts), an average service response time, a number of service requests, or the amount of observed network traffic (e.g. ingress traffic, egress traffic, traffic using a specific communication protocol, etc.). The time series data may be generated at different frequencies (e.g. hourly, daily, weekly) depending on the configuration.

At operation 730, the system generates forecast data (e.g. forecast data 160) for the time series data. The forecast data may be generated by a component such as the data forecaster 150 of FIG. 1, and may be based on knowledge of seasonal characteristics of the time series data, such as periodic trends or patterns. The forecast data will include predicted values for the time series data, along with confidence intervals for the predicted values, as shown in FIG. 3. Depending on the embodiment, the forecast data may be generated by a static function or a machine-learned forecasting model trained with previous time series data. Aspects of the machine learning model may be configured via a configuration interface such as GUI 500.

At operation 740, the observed values of the time series data are evaluated with respect to the predicted values and confidence intervals in the forecast data, according to one or more statistical control rules (e.g. SCRs 172). Operation 740 may be performed by a component such as the data monitor 170 of FIG. 1. The SCRs may define various anomalous behaviors of the time series data with respect to the predicted values and the confidence intervals. Examples of some SCRs are described in connection with FIGS. 4A to 4D. In some embodiments, the SCRs may be specified in terms of a distance metric between an observed value and its predicted value, and may be normalized based on the size of the confidence interval. In some embodiments, multiple SCRs may be combined into a more complex detection rule using Boolean or conditional logic, or combined mathematically to produce an anomaly score. In some embodiments, the SCRs may be defined and tuned using a configuration interface such as GUI 600. The configuration interface may allow the user to visualize the performance of the rules over real sections of the time series data, and experiment with variations of the rules based on real time performance feedback.

At operation 750, the system (e.g. the data monitor 170) determines whether an anomaly is detected in the time series data based on the evaluation of the SCRs. If an anomaly is detected (e.g. one or more last observations in the time series data satisfied a detection trigger), the process proceeds to operation 780, where an alert indicating the anomaly is generated. If no anomaly is detected, the process loops back to operation 710. In some embodiments, the process may occur continuously, so that forecast data is continuously generated for successive time periods, and the time series data is continuously monitored in successive periods based on previously generated forecast data.

At operation 760, the system generates the alert (e.g. anomaly alert 190). In some embodiments, the alert may be generated via an alert interface 180, which may be a graphical user interface, an email interface, a messaging interface, or a programmatic interface such as an API. In some embodiments, the generated alert may include information that identifies the activity metric in question, the time of the detected anomaly, and one or more SCRs that were triggered. The alert may also include other contextual information such as the identity of one or more users, machines, processes, or communications connected with the detected anomaly. In some embodiments, the alert may be logged along with the time series data, so that it can be analyzed later by human analysts or a more sophisticated assessment tool (e.g. assessment services 272, 274, and 276 of FIG. 2).

Figure 8:
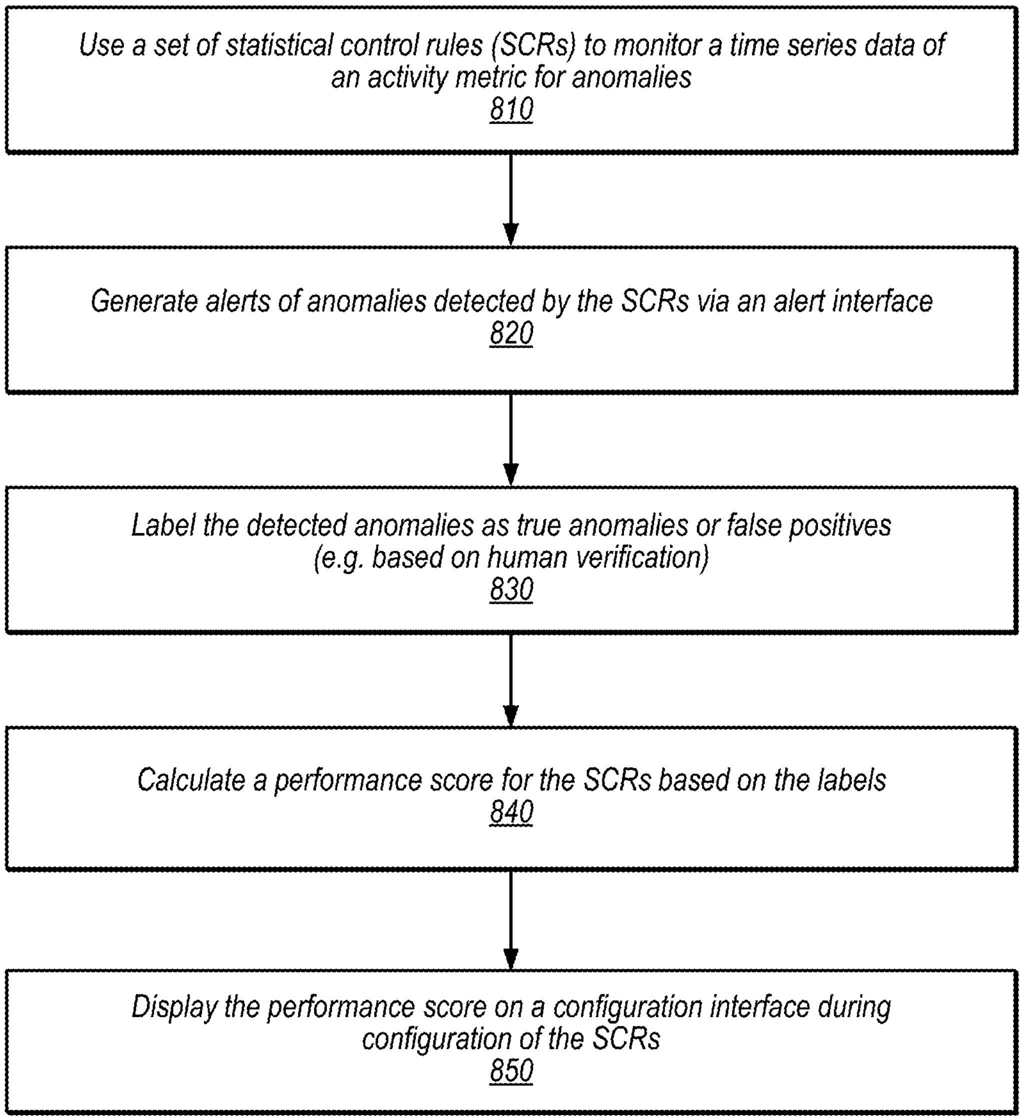
FIG. 8 is a flowchart illustrating a process of calculating a performance score for a statistical control rule based on human generated labels on a time series data, according to some embodiments.

FIG. 8 is a flowchart illustrating a process of calculating a performance score for a statistical control rule based on human generated labels on a time series data, according to some embodiments. The process may be performed by an embodiment of the network anomaly detection system 120 of FIG. 1.

At operation 810, a set of SCRs are used to monitor a time series data of an activity metric for anomalies. At operation 820, alerts of anomalies detected by the SCRs are generated via an alert interface. Operations 810 and 820 may be performed in a manner as described in connection with FIG. 7.

At operation 830, the detected anomalies are labeled as true anomalies or false positives. Such labeling may be made based on the results of human verification. For example, in some embodiments, the alerts generated by the network anomaly detection system will be investigated by a human security analyst to verify whether the underlying network activities associated with an alert represent something truly anomalous, unexpected, or suspicious. If so, the analyst may indicate his or her finding to the system, for example, in an open ticket for the anomaly and/or an instruction to initiate remediation actions. This input from the analyst will cause the anomaly to be labeled as a true anomaly. On the other hand, if the analyst determines that the reported anomaly is not an actual anomaly (e.g. something that is expected, normal, or harmless), he or she may close the ticket, update the SCRs applied to the data, or take no action at all. In that case, the alert may be labeled as a false positive. In some embodiments, these types of labels may be recorded with the time series data, for example, in the log repository 254 of FIG. 2.

At operation 840, a performance score is calculated for the SCRs based on the true anomaly/false positive labels of the time series data. The performance score may be a performance metric such as the percentage of true anomalies that were detected, or the percentage of detected anomalies that were true anomalies or false positives. In some embodiments, the performance score may be calculated in response to a user command, for an individual SCR, a selected set of SCRs, and/or over a selected time range.

At operation 850, the performance score is displayed on a configuration interface (e.g. GUI 600) during configuration of the SCRs. For example, the performance score may be calculated in real time for a newly configured SCR by applying the new SCR to a selected range of the time series data and comparing the new SCR's detections to the true anomaly/false positive labels of the time series data. The performance score may be updated as the user changes the SCRs via the configuration interface. In this manner, the configuration interface is able to provide the user real time performance feedback about the rules as they are being configured.

Figure 9:
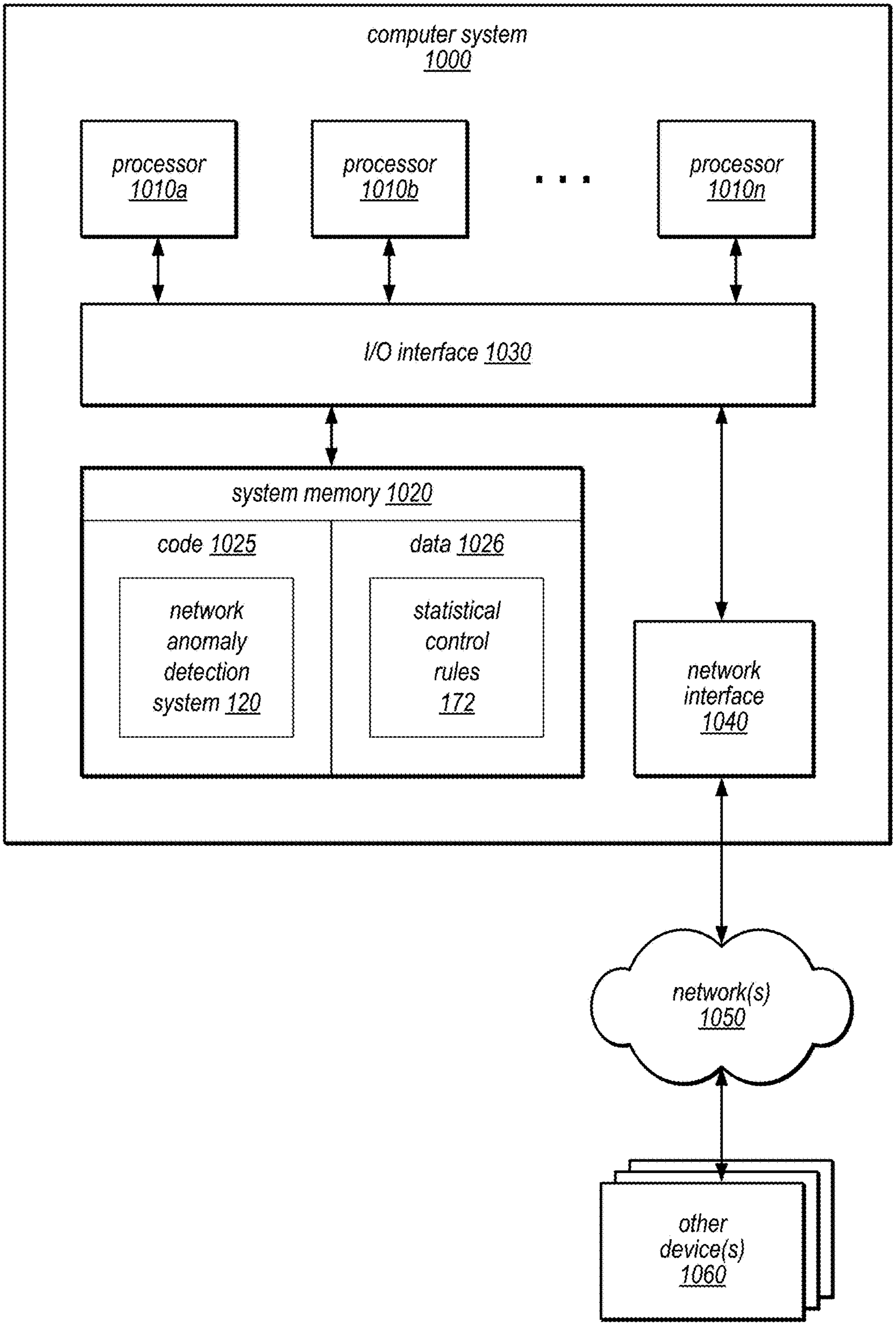
FIG. 9 is a block diagram illustrating a computer system that can be used to implement one or more portions of a network anomaly detection system, according to some embodiments.

FIG. 9 is a block diagram illustrating a computer system that can be used to implement one or more portions of a network anomaly detection system, according to some embodiments. For example, the computer system 1000 may be a server that implements one or more components of the network anomaly detection system 120 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. In some embodiments, the computer system 1000 may be an embedded system that performs a dedicated function within a specialized hardware system, such as a networking device (e.g. a router). In some embodiments, the network anomaly detection system may be implemented on an instance of a virtual machine, which may be running in a cloud-based environment such as a platform service provider network, as discussed in connection with FIG. 2.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010*a-n*, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement executable modules of the network anomaly detection system 120, as discussed in connection with FIG. 1. The system memory 1020 may also be used to store data 1026 needed by the executable instructions. For example, the in-memory data 1026 may be used to store the statistical control rules 172, as discussed in connection with FIG. 1.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A method comprising:

performing, by one or more computing systems that implements a network anomaly detection system:

collecting activity data about a computer network over time;

extracting, from the activity data, time series data of an activity metric;

generating forecast data for the time series data based on one or more seasonal characteristics of the time series data, the forecast data including (a) predicted values for the time series data and (b) confidence intervals of the predicted values;

storing a plurality of statistical control rules (SCRs), wherein the SCRs are defined via a graphical user interface (GUI) of the network anomaly detection system configured to edit the SCRs and display a performance score of the SCRs for detecting anomalies over a selected time range;

evaluating observed values of the time series data with respect to the forecast data according to SCRs, wherein the evaluation comprises, in successive time periods:

applying the SCRs to a current value of the activity metric observed in a current time period, and generating a next value of the activity metric for a next time period and the next confidence interval for the next value, and wherein the SCRs comprise at least (a) a first rule that checks whether a distance metric between the current value of the activity metric and a corresponding predicted value exceeds a first specified threshold, the distance metric calculated based on the confidence interval of the predicted value, and (b) a second rule that checks whether the distance metric for a last number or specified proportion of observed values of the activity metric exceeded a second specified threshold;

detecting an anomaly in the time series data based on the evaluation;

generating, via the GUI, an alert indicating the anomaly and network activities in the computer network associated with the alert; and responsive to user input received via the GUI, initiating one or more remediations on the computer network.

2. The method of claim 1, wherein the forecast data is generated by a machine learning model that encodes knowledge of the seasonal characteristics of the time series data.

3. The method of claim 2, further comprising the network anomaly detection system:

receiving user input to train the machine learning model, the user input specifying (a) a training dataset for the training, and (b) one or more seasonality parameters of the time series data; and training the machine learning model according to the user input.

4. The method of claim 1, wherein the time series data is stored in a log repository.

5. The method of claim 1, wherein the detected anomaly is used by one or more assessment services to perform a security assessment of the computer network, including one or more of a malware detection service, a phishing detection service, and a intrusion detection service.

6. The method of claim 1, further comprising displaying, via the GUI, a number or proportion of false positive anomalies detected by the SCRs over the selected time range.

7. The method of claim 1, wherein the SCRs include another rule that checks whether a last number of observed values of the activity metric trended in an opposite direction as corresponding predicted values.

8. The method of claim 1, wherein the SCRs include another rule that checks whether a last number of observed values of the activity metric alternated above and below corresponding predicted values.

9. The method of claim 1, wherein the GUI defines a plurality of SCRs, and the performance score is calculated based on a subset of the SCRs selected via the GUI.

10. The method of claim 1, wherein the GUI displays a time graph that indicates:

(a) observed values of the activity metric over a selected time range, (b) predicted values of the activity metric over the selected time range, (c) confidence intervals of the predicted values over the selected time range, and (d) one or more points in the selected time range where the SCRs were triggered.

11. The method of claim 1, wherein the performance score is calculated based on human verifications of anomalies detected by the SCRs as true or false anomalies.

12. The method of claim 1, further comprising the network anomaly detection system sending the alert in an email or a text message.

13. The method of claim 1, further comprising the network anomaly detection system:

collecting activity data from a plurality of computer networks; and monitoring the activities data for anomalies based on different types of activity metrics, wherein the activity metrics are used as signals to detect cyberattacks on the computer networks or security vulnerabilities in the computer networks.

14. The method of claim 13, wherein the different types of activity metrics are measured for individual time periods, and include one or more of:

a number of network events observed in a time period, a number of errors observed in the time period, a number of failed logins observed in the time period, an average service response time observed during the time period, and an amount of a type of network traffic observed in the time period.

15. A system comprising:

one or more computing systems that implements a network anomaly detection system, configured to:

collect activity data about a computer network over time;

extract, from the activity data, time series data of an activity metric;

generate forecast data for the time series data based on one or more seasonal characteristics of the time series data, the forecast data including (a) predicted values for the time series data and (b) confidence intervals of the predicted values;

store a plurality of statistical control rules (SCRs), wherein the SCRs are defined via a graphical user interface (GUI) of the network anomaly detection system configured to edit the SCRs and display a performance score of the SCRs for detecting anomalies over a selected time range;

evaluate observed values of the time series data with respect to the forecast data according to SCRs, wherein the evaluation includes to, in successive time periods:

apply the SCRs to a current value of the activity metric observed in a current time period, and generate a next value of the activity metric for a next time period and the next confidence interval for the next value, and wherein the SCRs comprise at least (a) a first rule that checks whether a distance metric between the current value of the activity metric and a corresponding predicted value exceeds a first specified threshold, the distance metric calculated based on the confidence interval of the predicted value, and (b) a second rule that checks whether the distance metric for a last number or specified proportion of observed values of the activity metric exceeded a second specified threshold;

detect an anomaly in the time series data based on the evaluation;

generate, via the GUI, an alert indicating the anomaly and network activities in the computer network associated with the alert; and responsive to user input received via the GUI, initiate one or more remediations on the computer network.

16. The system of claim 15, wherein the prediction data is generated by a machine learning model that encodes knowledge of the seasonal characteristics of the time series data.

17. The system of claim 15, wherein the detected anomaly is used by one or more assessment services to perform a security assessment of the computer network, including one or more of a malware detection service, a phishing detection service, and a intrusion detection service.

18. The system of claim 15, wherein the SCRs include one or more rules that checks:

whether the last number of observed values trended in an opposite direction as corresponding predicted values, or whether the last number of observed values alternated above and below the corresponding predicted values.

19. The system of claim 15, wherein:

the GUI displays a time graph that indicates:

(a) observed values of the activity metric over a selected time range, (b) predicted values of the activity metric over the selected time range, (c) confidence intervals of the predicted values over the selected time range, and (d) one or more points in the selected time range where the SCRs were triggered.

20. One or more non-transitory computer-readable storage media storing program instructions that when executed on or across one or more processors implement a network anomaly detection system and cause the network anomaly detection system to:

collect activity data about a computer network over time;

extract, from the activity data, a time series data of an activity metric;

generate forecast data for the time series data based on one or more seasonal characteristics of the time series data, the forecast data including (a) predicted values for the time series data and (b) confidence intervals of the predicted values;

store a plurality of statistical control rules (SCRs), wherein the SCRs are defined via a graphical user interface (GUI) of the network anomaly detection system configured to edit the SCRs and display a performance score of the SCRs for detecting anomalies over a selected time range;

evaluate observed values of the time series data with respect to the forecast data according to SCRs, wherein the evaluation includes to, in successive time periods:

apply the SCRs to a current value of the activity metric observed in a current time period, and generate a next value of the activity metric for a next time period and the next confidence interval for the next value, and wherein the SCRs comprise at least (a) a first rule that checks whether a distance metric between the current value of the activity metric and a corresponding predicted value exceeds a first specified threshold, the distance metric calculated based on the confidence interval of the predicted value, and (b) a second rule that checks whether the distance metric for a last number or specified proportion of observed values of the activity metric exceeded a second specified threshold;

detect an anomaly in the time series data based on the evaluation;

generate, via the GUI, an alert indicating the anomaly and network activities in the computer network associated with the alert; and responsive to user input received via the GUI, initiate one or more remediations on the computer network.

* * * * *